United States Patent
Sobel et al.

(10) Patent No.: US 8,225,401 B2
(45) Date of Patent: Jul. 17, 2012

(54) METHODS AND SYSTEMS FOR DETECTING MAN-IN-THE-BROWSER ATTACKS

(75) Inventors: William E. Sobel, Jamul, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 871 days.

(21) Appl. No.: 12/338,456

(22) Filed: Dec. 18, 2008

(65) Prior Publication Data

US 2010/0162393 A1    Jun. 24, 2010

(51) Int. Cl.
*H04L 29/06* (2006.01)
*G06F 11/00* (2006.01)
*G06F 12/14* (2006.01)
*G06F 12/16* (2006.01)
*G08B 23/00* (2006.01)
*H04L 9/32* (2006.01)

(52) U.S. Cl. .............. 726/23; 726/3; 726/7; 726/24; 726/25; 726/26; 713/168; 713/170; 713/176

(58) Field of Classification Search .............. None
See application file for complete search history.

(56) References Cited

U.S. PATENT DOCUMENTS

| 7,668,921 B2* | 2/2010 | Proux et al. ............ 709/206 |
| 2006/0174119 A1* | 8/2006 | Xu ............ 713/170 |
| 2006/0265340 A1* | 11/2006 | Ziv et al. ............ 705/76 |
| 2008/0104672 A1* | 5/2008 | Lunde et al. ............ 726/3 |
| 2009/0106556 A1* | 4/2009 | Hamid ............ 713/176 |
| 2009/0138950 A1* | 5/2009 | Hird ............ 726/7 |
| 2009/0248580 A1* | 10/2009 | Baentsch et al. ............ 705/67 |
| 2009/0327138 A1* | 12/2009 | Mardani et al. ............ 705/64 |
| 2010/0049975 A1* | 2/2010 | Parno et al. ............ 713/168 |
| 2010/0083383 A1* | 4/2010 | Adler et al. ............ 726/26 |
| 2010/0088766 A1* | 4/2010 | Michaely et al. ............ 726/23 |
| 2010/0217799 A1* | 8/2010 | Heider et al. ............ 709/203 |
| 2010/0257359 A1* | 10/2010 | Currie ............ 713/168 |

* cited by examiner

*Primary Examiner* — Shin-Hon Chen
(74) *Attorney, Agent, or Firm* — Advantedge Law Group

(57) ABSTRACT

A computer-implemented method for detecting man-in-the-browser attacks may include identifying a transaction fingerprint associated with a web site. The method may also include tracking a user's input to the web site. The user's input may be received through a web browser. The method may further include intercepting an outgoing submission to the web site. The method may additionally include determining whether, in light of the transaction fingerprint, the user's input generated the outgoing submission. Various other methods, systems, and computer-readable media are also disclosed.

20 Claims, 5 Drawing Sheets

METHODS AND SYSTEMS FOR DETECTING MAN-IN-THE-BROWSER ATTACKS

BACKGROUND

Consumers and businesses increasingly conduct sensitive transactions via the internet. Such transactions may be secured through an authentication protocol to ensure that the transactions are authorized. For instance, a web site may require a customer to submit a password to establish an authenticated session. Transactions conducted in the authenticated session may be allowed, and all other transactions may be rejected.

An attacker may conduct illegitimate transactions with a web site despite authentication requirements. For example, in a man-in-the-browser attack, malware on a user's system may wait for the user to create an authenticated session for the web site. The malware may then submit a transaction request within the authenticated session.

A web site server may attempt to detect illegitimate transactions. However, to the server, an illegitimate transaction conducted within an authenticated session may appear identical to a legitimate transaction conducted within an authenticated session.

SUMMARY

The instant disclosure is directed to methods and systems for detecting man-in-the-browser attacks. Various embodiments describe the actions of a fingerprint module, a user interaction module, and a web request module. For example, the fingerprint module may identify a transaction fingerprint associated with a web site. A transaction fingerprint may include the expected number of submissions to the web site, the expected order of submissions to the web site, or any other information relevant to determining whether a submission to the web site is legitimate. In some embodiments, the fingerprint module may receive the transaction fingerprint from a security vendor. In other embodiments, the fingerprint module may generate the transaction fingerprint based on the user's past input to the web site.

When a user navigates to certain web sites in a web browser, the user interaction module may track the user's input to the web site by monitoring input events in the web browser. These input events may be from a mouse, a keyboard, or any other input device that may be used with a web browser. A web request module may, in the meantime, intercept any outgoing submissions to the web site. The web request module may then compare the user's input with the outgoing submissions. The web request module may determine whether, in light of the transaction fingerprint, the user's input generated the outgoing submissions.

The web request module may determine whether the user's input generated the outgoing submissions by comparing the number of outgoing submissions with the number of intended submissions as indicated by the user's input and the number of expected submissions as indicated by the transaction fingerprint. If the web request module determines that the user's input generated the outgoing submissions, it may relay the submissions to the web site. Otherwise, the web request module may perform a security action, such as prompting the user to confirm that a submission was intended.

Features from any of the above-mentioned embodiments may be used in combination with one another in accordance with the general principles described herein. Embodiments of the present disclosure may provide various advantages over prior technologies. For example, methods described herein may allow a user's system to detect illegitimate submissions to a web site where the web site server could not. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
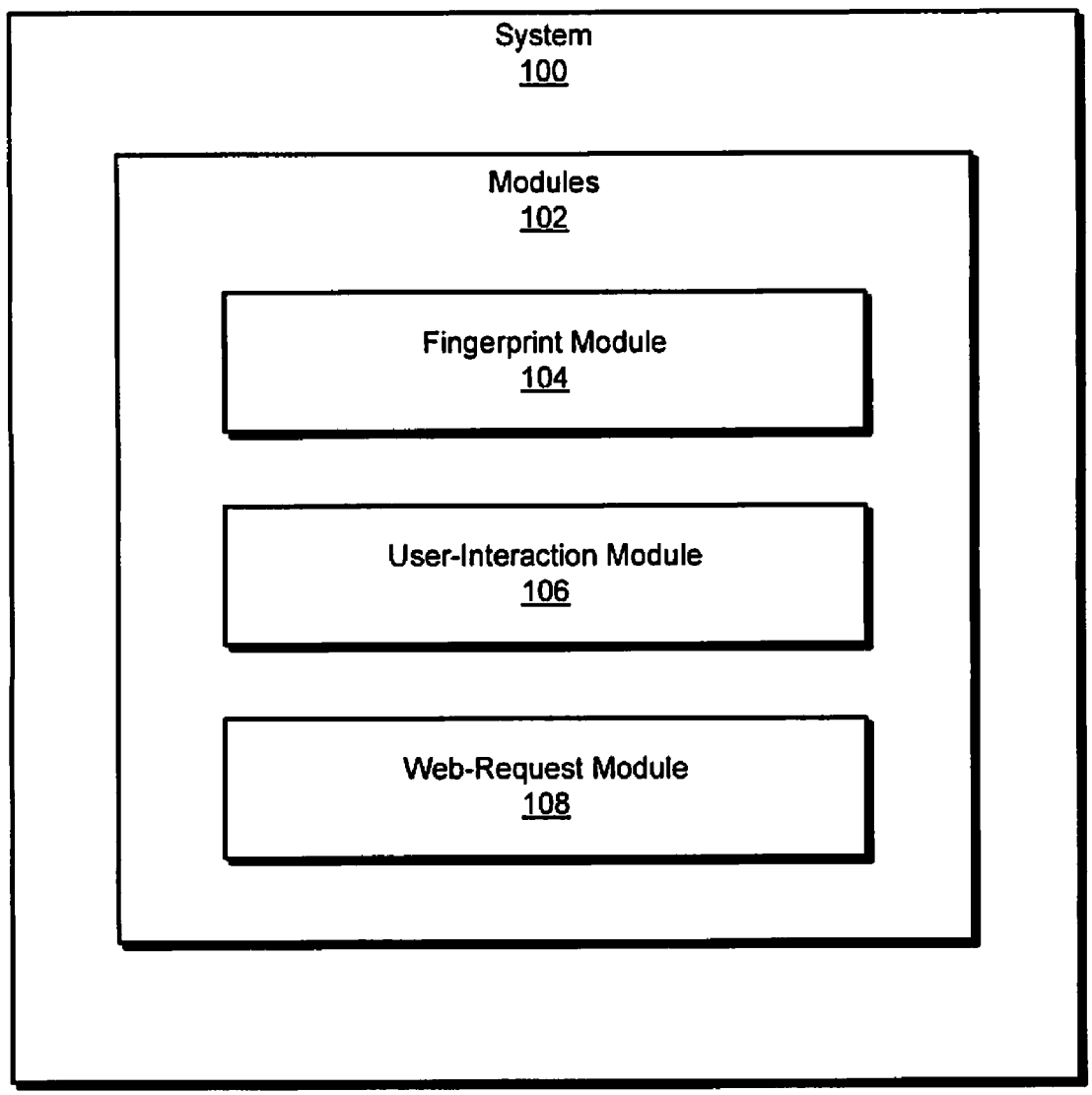
FIG. 1 is a block diagram of an exemplary host computer according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Figure 2:
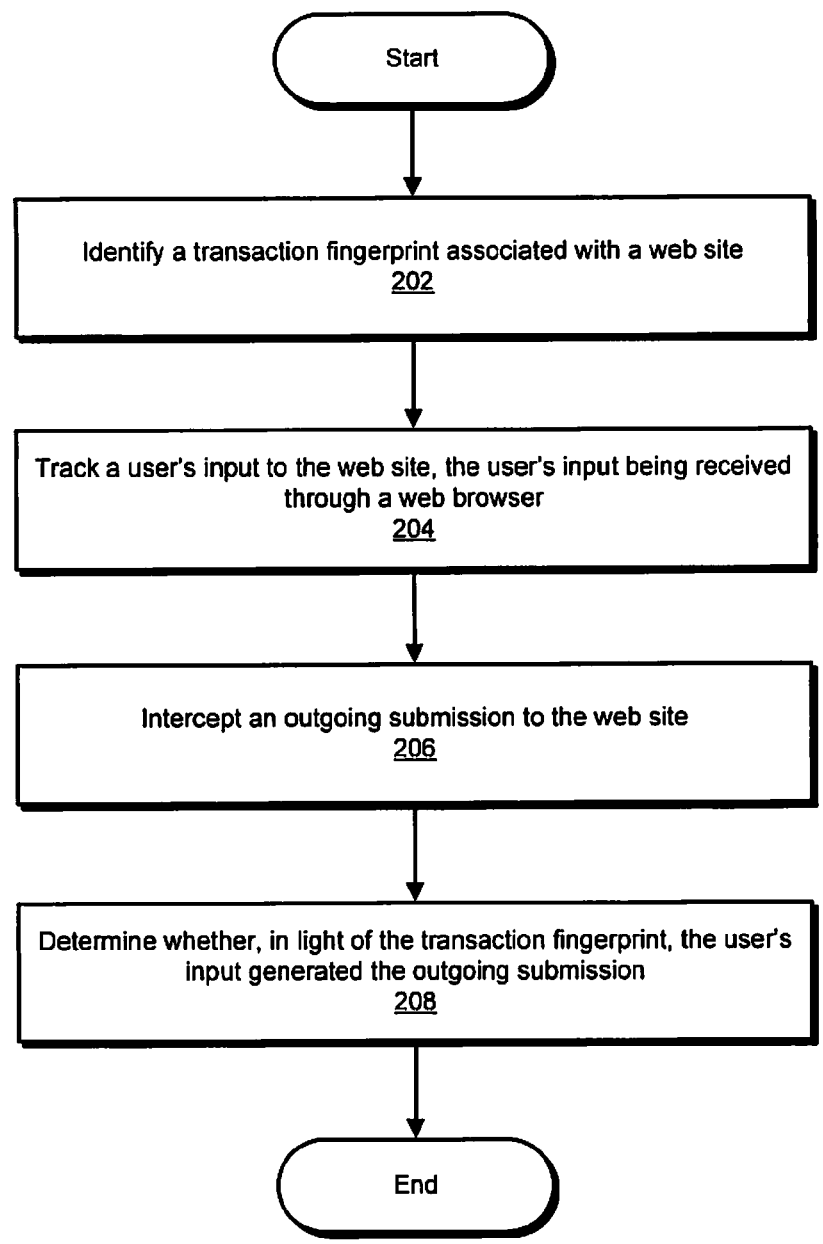
FIG. 2 is a flow diagram of a computer-implemented method for detecting man-in-the-browser attacks.
Figure 3:
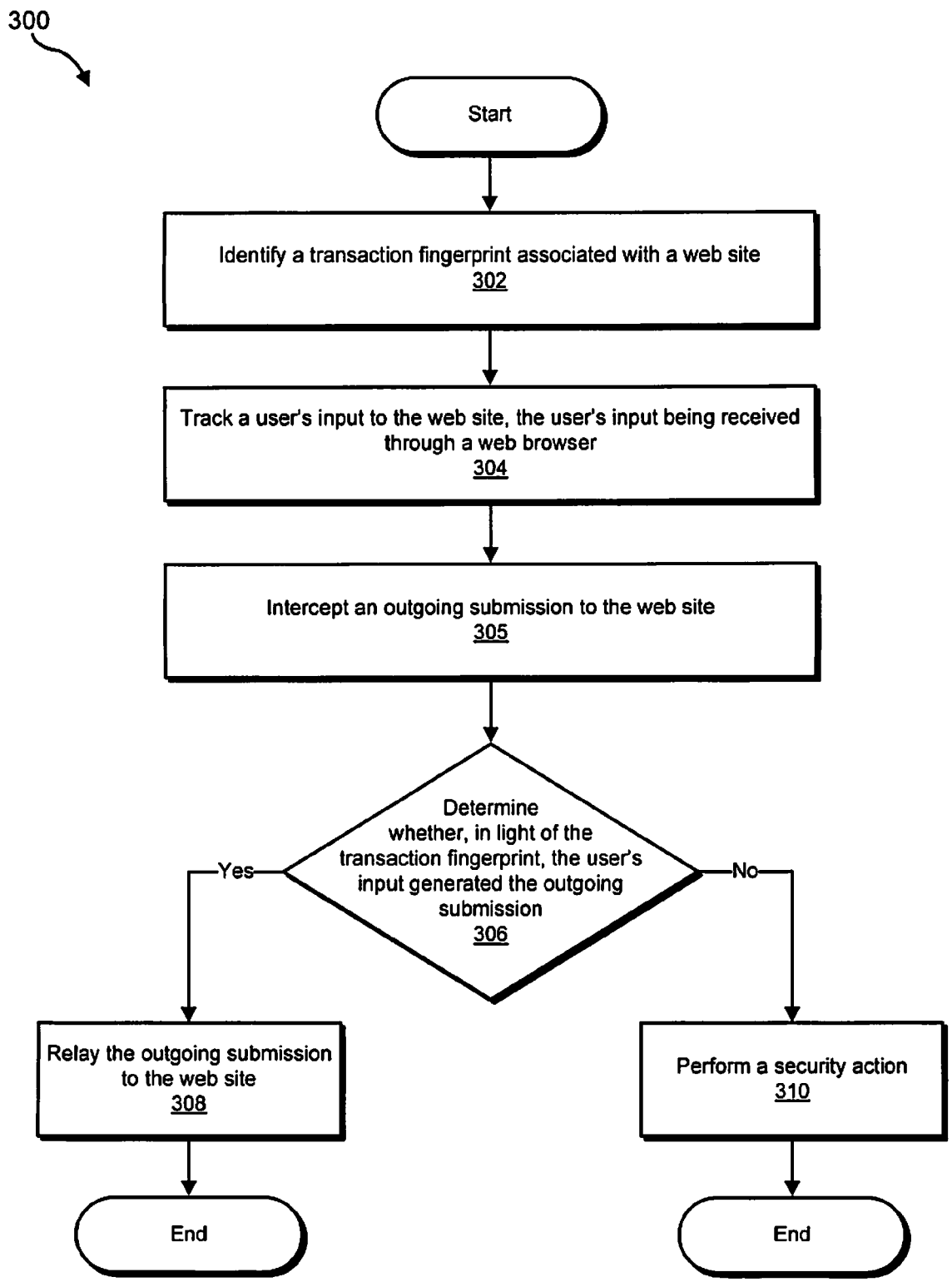
FIG. 3 is a flow diagram of a computer-implemented method for processing legitimate and illegitimate submissions.

Embodiments of the present disclosure provide various methods and systems for detecting man-in-the-browser attacks. As previously mentioned, a web request module may determine whether a submission to a web site is legitimate by comparing the submission to a variety of other data. Accompanying drawings illustrate systems and methods to accomplish this. FIG. 1 shows a computing system with a fingerprint module, a user interaction module, and a web request module. FIGS. 2 and 3 show steps that may be performed by these modules on the computing system.

FIG. 1 shows an exemplary system 100. System 100 may be any suitable computing device. For example, system 100 may be computing device 410 shown in FIG. 4, and/or may be implemented by any of the network devices shown in FIG. 5. System 100 may include multiple modules, such as fingerprint module 104, user interaction module 106, and web request module 108. These modules may be any module, application, or other computer-executable code capable of performing one or more of the steps disclosed herein.

Fingerprint module 104 may identify a transaction fingerprint associated with a web site. The transaction fingerprint may be from a security vendor, or fingerprint module 104 may have generated the transaction fingerprint based on a user's previous interactions with the web site. For example, user interaction module 106 may track the user's input to the web site, and fingerprint module 104 may analyze the input and store information about the resulting submission. For instance, fingerprint module 104 may record the number of submissions a transaction entails, how the submission fits into the normal transaction flow (i.e., the order in which a submission occurs), or other distinguishing characteristics of the submission.

In some embodiments, the transaction fingerprint may comprise an expected number of submissions to the web site. For instance, a web site might require three form submissions in order to complete a transaction. In some embodiments, the transaction fingerprint may comprise an expected order of submissions to the web site. For example, a web site might present one form to submit before another form is presented to submit. A transaction fingerprint may also comprise any other suitable information for helping to determine whether a transaction is legitimate.

User interaction module 106 may track the user's input to the web site. The user's input may be entered through a web browser. The input may be generated by a mouse, a keyboard, or any other input device, such as input device 428, which may be used with a web browser. In some embodiments, tracking the user's input may comprise tracking the number of submissions the user generates through the web browser. In other words, user interaction module 106 may determine, based on the user's input, how many data submissions to the web site the user intended. For instance, a user might enter data with a keyboard into a first form and click a button with a mouse to submit the first form, and then enter data with a keyboard into a second form and click a button with a mouse to submit the second form. User interaction module 106 may determine, based on these input actions, that the user intended to submit two forms to the web site.

In certain embodiments, tracking the user's input may comprise tracking the order of submissions that the user generates through the web browser. In some embodiments, user interaction module 106 may determine, based on the user's input, what forms the user intended to submit to the web site, and in what order. For example, as in the previous example, the user may submit two forms (i.e., submissions) with the keyboard and mouse. In this embodiment, user interaction module 106 may record that the user submitted the first form first, and the second form second. In some embodiments, user interaction module 106 may analyze and/or store this input for later use as a transaction fingerprint. For example, a user may use a keyboard and mouse to fill out and submit a first form and then a second form in the course of conducting a transaction on a web site. The user interaction module may store the number and/or order of submissions performed for use as a transaction fingerprint in a future session.

Web request module 108 may intercept an outgoing submission to the web site. It may then compare the actual submission with the user's input tracked by the user interaction module. In some embodiments, web request module 108 may compare the actual number of submissions with the intended number of submissions as determined by the user's input. In other embodiments, web request module 108 may compare the actual order of submissions with the intended order of submissions as determined by the user's input.

Once web request module 108 compares the data on the submissions, it may determine whether, in light of the transaction fingerprint, the user's input generated the outgoing submission. In some embodiments, web request module 108 may determine whether the user's input generated the outgoing submission by determining whether the expected number of submissions to the web site matches both the intended number of submissions to the web site the user generates through the web browser and the actual number of submissions to the web site. In other words, web request module 108 may determine whether the fingerprint module, the user interaction module, and the web request module all agree on the number of submissions to the web site.

For example, fingerprint module 104 may indicate that two submissions are expected for the web site, user interaction module 106 may indicate that the user intended to make two submissions to the web site, and web request module 108 may indicate that four submissions were actually sent to the web site. In this example, web request module 108 may determine that the user's input did not generate all of the outgoing submissions.

In certain embodiments, web request module 108 may determine whether the user's input generated the outgoing submission by determining whether the expected order of submissions to the web site matches the actual order of submissions to the web site. For example, web request module 108 may expect, based on the user's input and/or a transaction fingerprint, a first submission followed by a second submission. The actual order detected by web request module 108 may be the second submission followed by the first submission. As a result, web request module 108 may determine that the user's input did not generate the outgoing submissions or that malware tampered with the outgoing submissions.

When web request module 108 determines that an outgoing submission is not generated by the user's input, web request module 108 may perform a security action. In some embodiments, web request module 108 may perform the security action by querying the user whether to relay the outgoing submission. In other embodiments, web request module 108 may perform the security action by preventing the submission from being relayed without asking the user. In certain embodiments, web request module 108 may perform the security action by submitting an incident report to a security vendor. This incident report may comprise a location of the web site, contents of the outgoing submission, information to identify the user, and/or date and time information associated with the outgoing submission.

When web request module 108 determines that an outgoing submission is generated by the user's input, web request module 108 may relay the outgoing submission to the web site. In other words, web request module 108 may hold the outgoing submission after intercepting it. After determining that the user intended to make the actual submission, web request module 108 may relay the outgoing submission to the web site.

FIG. 2 shows steps that may be performed by one or more of a fingerprint module, such as fingerprint module 104, a user interaction module, such as user interaction module 106, and a web request module, such as web request module 108. The fingerprint module may identify a transaction fingerprint associated with a web site (step 202). The transaction fingerprint may be any data associated with a transaction of a web site. For example, a transaction fingerprint may identify the number, type, and/or content of submissions expected during a transaction with a website. A transaction fingerprint may also identify the number, type, and/or content of forms or other data within a submission. The fingerprint module may identify the transaction fingerprint by accessing a database of transaction fingerprints. The database of transaction fingerprints may contain transaction fingerprints created by monitoring one or more transactions that a user conducts with a website. In other embodiments, the database of transaction fingerprints may be created by monitoring test transactions with a website.

In some embodiments, the database of transaction fingerprints may be accessed remotely on a security software company's web server. In other embodiments, the database of transaction fingerprints may be stored locally or may be accessed remotely on a web server associated with the web site of the transaction (e.g., a company that own the web site may provide transaction fingerprints).

The user interaction module may track a user's input to the web site through a web browser (step 204). For example, the user interaction module may monitor a web browser for input and may record the input that is relevant to determining the validity of a subsequent submission. The input may be input from a keyboard, input from a mouse, or input from any other suitable device.

In some embodiments, the transaction fingerprint may be identified after the user's input is tracked (e.g., step 202 may be performed after step 204). The fingerprint module may use the user's input to determine which transaction fingerprint to use. The fingerprint module may identify what type of transaction the user is conducting with the website, and then the fingerprint module may identify a transaction fingerprint associated with that type of transaction. For example, if the transaction is a payment transaction with a web site, the fingerprint module may identify a payment transaction fingerprint for the web site. If the transaction is a transaction for changing a user's settings, the fingerprint module may identify a setting change fingerprint for the web site. Various other classifications of transactions may be used to identify a transaction fingerprint.

After the user interaction module tracks the user's input, the web request monitor may intercept an outgoing submission to the web site (step 206). To intercept the outgoing submission to the web site, the web request monitor may detain an outgoing communication from the web browser. For example, the web request monitor may hook the web browser and intercept all form submissions sent from the web browser to the web site. Alternatively, the web request monitor may include an intercepting proxy on the user's system that intercepts all outgoing network communications and filters for web submissions.

The web request monitor may then determine whether, in light of the transaction fingerprint, the user's input generated the outgoing submission (step 208). The web request monitor may interpret the outgoing submission using the transaction fingerprint to determine whether the outgoing submission is consistent with the user's input. For example, the web request monitor may use the transaction fingerprint to determine whether the outgoing submission corresponds to (e.g., would be expected in light of) the user's input.

As an example of the process illustrated in FIG. 2, a user may use a web browser to navigate to a web site (e.g., PAYPAL.com). The fingerprint module may hook the web browser to monitor what web site is being visited and may determine that the user is visiting PAYPAL.com. The fingerprint module may then access a transaction fingerprint associated with PAYPAL.com. For example, the fingerprint module may look up the transaction fingerprint in a database on a local storage device, such as a hard drive, or it may communicate with a remote server and request that the remote server send the transaction fingerprint associated with PAYPAL.com. In some embodiments, numerous transaction fingerprints may be associated with PAYPAL.com (e.g., different transaction fingerprints for different types of transactions), and the fingerprint module may identify the type of transaction that the user is conducting with PALPAL.com before selecting a transaction fingerprint. In some embodiments, the fingerprint module may select the transaction fingerprint based on the type of transaction that the user is conducting with PAYPAL.com.

The user may navigate to a web page on PAYPAL.com that has a form to fill out to conduct a money-transfer transaction. In this example, the user interaction module may hook the web browser to monitor input events to the web browser. The user may use a keyboard to type a bank account number into a field in the form, and the user interaction module may record the input. The user may then use a mouse to click on a button to submit the bank account number, and the user interaction module may record this input. The web browser may then load another page with a different form. The user might use the keyboard to type a transaction amount into a field in this form, and the user interaction module may record the input. The user may then use the mouse to click on a button to submit the transaction amount, and the user interaction module may record this input. Each time the user clicks on a button to submit a form, the web browser may send a communication to the PAYPAL.com server. The web request monitor may intercept these communications. In some embodiments, the web request monitor may save the communications and prevent them from being submitted until later.

The transaction fingerprint identified for the transaction with PAYPAL.com may identify the number and order of submissions expected during the transaction. The web request monitor may determine whether the user's transmissions to PAYPAL.com, in light of the transaction fingerprint, are legitimate. To make this determination, the web request monitor may determine whether the user's web browser sends the expected number of submissions in the expected order to PAYPAL.com.

If malware on the user's system attempts to submit an additional transaction form to PAYPAL.com, the web request monitor may determine that this submission is illegitimate since the user appeared to only submit two forms to PAYPAL.com (based on the user's input), while three forms in total were submitted. Alternatively, the web request monitor may determine that the submission may be illegitimate because the third submission came outside the normal transaction flow of PAYPAL.com transactions. For example, the web request monitor may determine that the form sent by the malware is a form that should not be sent from the web browser unless other forms are first submitted, and the web request monitor may determine that the web browser did not submit the other forms first.

FIG. 3 shows steps that may be performed by a security module, which may provide the functionality of one or more of the other modules described herein. The security module may identify a transaction fingerprint associated with a website (step 302). The security module may track a user's input to the web site (step 304). The user's input may be received through a web browser. The security module may also intercept an outgoing submission sent from the web browser to the web site (step 305). The security module may determine whether, in light of the transaction fingerprint, the user's input generated the outgoing submission (decision point 306). If the user's input did generate the outgoing submission, the web request module may relay the outgoing submission to the web site (step 308). In other words, the web request module may send the submission to the web site as if it were the web browser. For example, the web request module may access a network interface card and transmit intercepted web form data to the server of the web site.

If, however, the user's input did not generate the outgoing submission, the web request module may perform a security action (step 310). For example, the web request module may prompt the user to confirm that the submission was intended. The web request module may prompt the user by displaying a dialog box, or any other suitable user interface object, that displays information about the attempted submission along with buttons that the user may click to choose whether to transmit or terminate the submission. In other embodiments, the web request module may send a report of the potential malware problem to a security software vendor or a security software program. The web request module may also perform any other suitable security measure.

Figure 4:
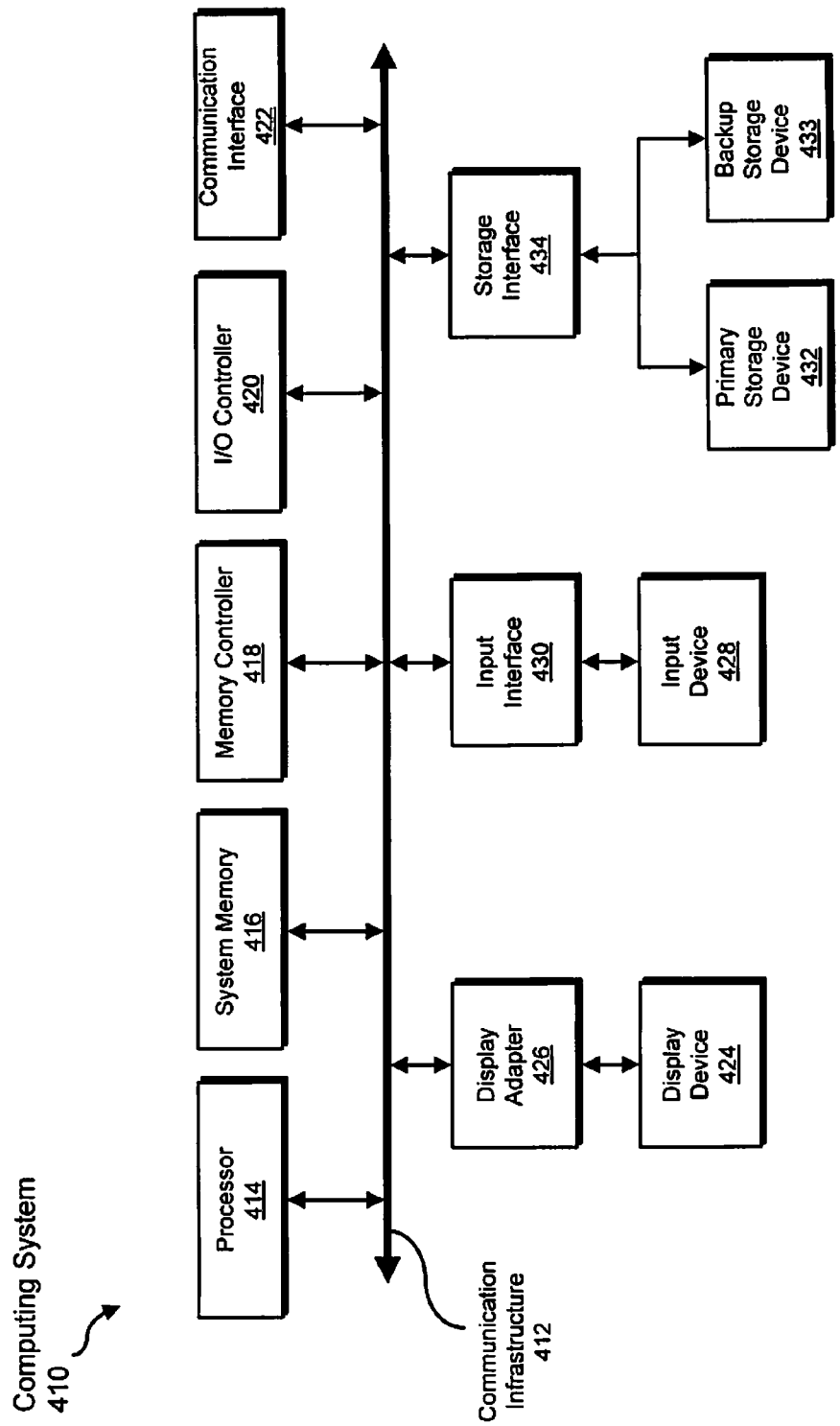
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may comprise at least one processor 414 and system memory 416.

Processor 414 generally represents any type or form of processing unit capable of processing data or interpreting and executing instructions. In certain embodiments, Processor 414 may receive instructions from a software application or module. These instructions may cause processor 414 to perform the functions of one or more of the exemplary embodiments described and/or illustrated herein. For example, processor 414 may perform and/or be a means for performing, either alone or in combination with other elements, one or more of the identifying, tracking, intercepting, comparing, determining, relaying, performing, submitting, and/or generating steps described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may comprise both a volatile memory unit (such as, for example, system memory 416) and a non-volatile storage device (such as, for example, primary storage device 432, as described in detail below).

In certain embodiments, exemplary computing system 410 may also comprise one or more components or elements in addition to processor 414 and system memory 416. For example, as illustrated in FIG. 4, computing system 410 may comprise a memory controller 418, an input/output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments, memory controller 418 may control communication between processor 414, system memory 416, and I/O controller 420 via communication infrastructure 412. In certain embodiments, memory controller 418 may perform and/or is a means for performing, either alone or in combination with other elements, one or more of the steps or features described and/or illustrated herein, such as identifying, tracking, intercepting, comparing, determining, relaying, performing, submitting, and/or generating.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434. 1/0 controller 420 may be used, for example, to perform and/or be a means for identifying, tracking, intercepting, comparing, determining, relaying, performing, submitting, and/or generating steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments, communication interface 422 may facilitate communication between computing system 410 and a private or public network comprising additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the internet. Communication interface 422 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution. In certain embodiments, communication interface 422 may perform and/or be a means for performing, either alone or in combination with other elements, one or more of the identifying, tracking, intercepting, comparing, determining, relaying, performing, submitting, and/or generating steps disclosed herein. Communication interface 422 may also be used to perform and/or be a means for performing other steps and features set forth in the instant disclosure.

As illustrated in FIG. 4, computing system 410 may also comprise at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also comprise at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the identifying, tracking, intercepting, comparing, determining, relaying, performing, submitting, and/or generating steps disclosed herein. Input device 428 may also be used to perform and/or be a means for performing other steps and features set forth in the instant disclosure.

As illustrated in FIG. 4, exemplary computing system 410 may also comprise a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also comprise other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Storage devices 432 and 433 may also be used, for example, to perform and/or be a means for performing, either alone or in combination with other elements, one or more of the identifying, identifying, tracking, intercepting, comparing, determining, relaying, performing, submitting, and/or generating steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
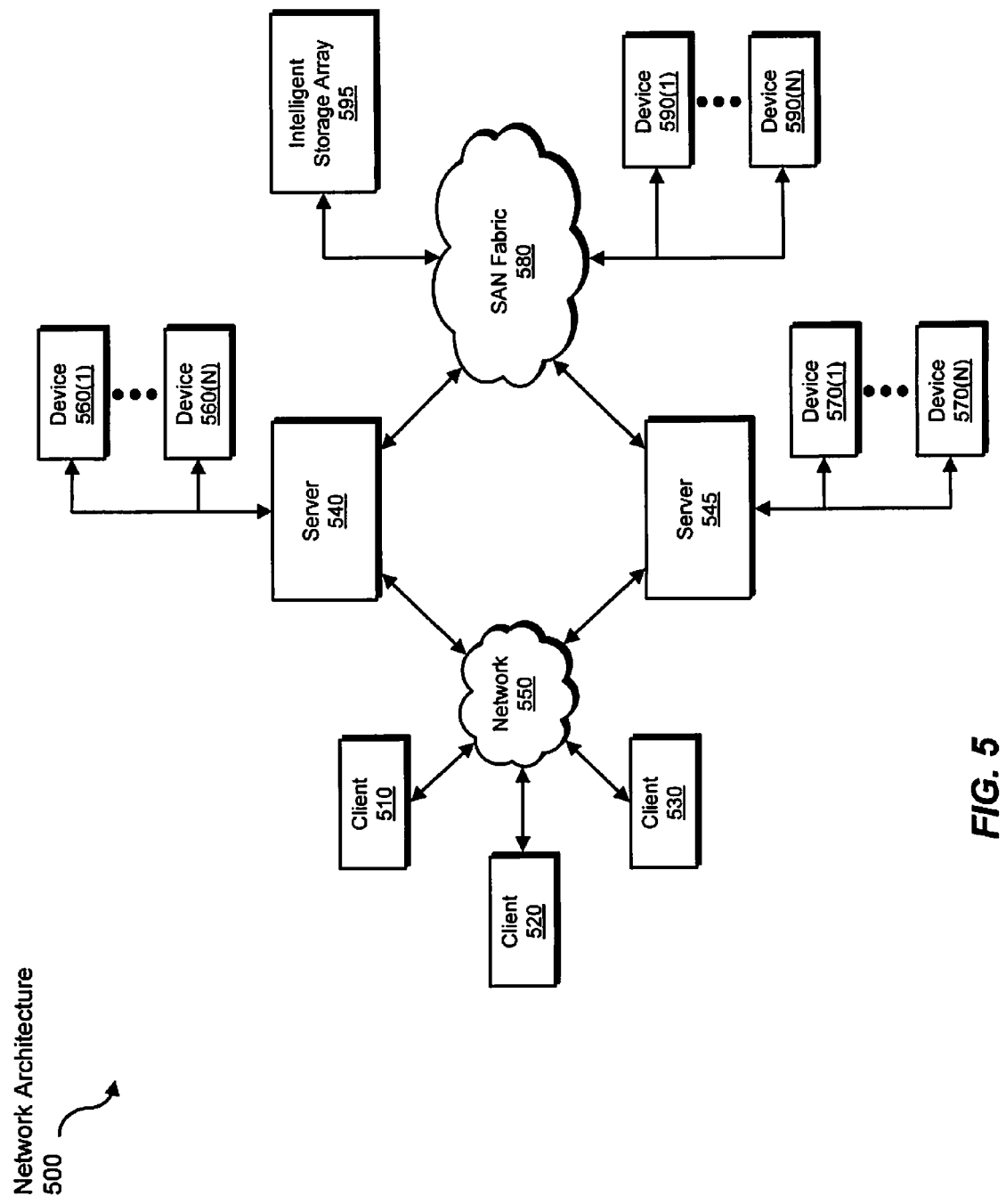
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or to run certain software applications. Network 550 generally represents any telecommunication or computer network; including, for example, an intranet, a wide area network (WAN), a local area network (LAN), a personal area network (PAN), or the internet.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the internet) for exchanging data, the embodiments described and/or illustrated herein are not limited to the internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and/or distributed to client systems 510, 520, and 530 over network 550. Accordingly, network architecture 500 may perform and/or be a means for performing, either alone or in combination with other elements, one or more of the identifying, tracking, intercepting, comparing, determining, relaying, performing, submitting, and/or generating steps disclosed herein. Network Architecture 500 may also be used to perform and/or be a means for performing other steps and features set forth in the instant disclosure.

As detailed above, computing system 410 and/or one or more of the components of network architecture 500 may perform and/or be a means for performing, either alone or in combination with other elements, one or more steps of the exemplary methods described and/or illustrated herein. For example, a computer system (e.g., computing system 410 and/or one or more of the components of network architecture 500) may perform a computer-implemented method for detecting man-in-the-browser attacks. The computer system may identify a transaction fingerprint associated with a web site. The computer system may then track a user's input to the web site. The user's input may be received through a web browser. The computer system may also intercept an outgoing submission to the web site. The computer system may subsequently compare the user's input with the outgoing submission to determine whether, in light of the transaction fingerprint, the user's input generated the outgoing submission. In certain embodiments, the computer system may relay the outgoing submission to the web site, if the outgoing submission is determined to have been generated by the user's input.

In at least one embodiment, tracking the user's input to the web site in a web browser may comprise tracking an intended number of submissions the user generates through the web browser. In some embodiments, the transaction fingerprint may comprise an expected number of submissions to the web site. In certain further embodiments, the computer system may determine whether the expected number of submissions to the web site matches both the intended number of submissions to the web site the user generates through the web browser, and an actual number of submissions to the web site.

According to some embodiments, the transaction fingerprint may comprise an expected order of submissions to the website. In certain further embodiments, the computer system may determine whether the expected order of submissions to the web site matches an actual order of submissions.

In some embodiments, the transaction fingerprint may be supplied by a security vendor. In some embodiments, the transaction fingerprint may be generated based on the user's input to the web site.

As defined in some embodiments, the computer system may perform a security action if the outgoing submission is not determined to have been generated by the user's input. In certain further embodiments, the computer may perform the security action by asking the user whether to relay the outgoing submission to the web server. In certain embodiments, the computer may perform the security action by submitting an incident report to a security vendor. The incident report may comprise a location of the web site, contents of the outgoing submission, information to identify the user, and/or data and time information. In several embodiments, the user's input may comprise input from a mouse and/or input from a keyboard.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method for detecting man-in-the-browser attacks, the method comprising:
    identifying a transaction fingerprint associated with a web site;
    tracking a user's input to the web site, the user's input being received through a web browser;
    intercepting an outgoing submission to the web site;
    determining whether, in light of the transaction fingerprint, the user's input generated the outgoing submission.

2. The computer-implemented method of claim 1, further comprising:
    comparing the user's input with the outgoing submission;
    if the outgoing submission is determined to have been generated by the user's input, relaying the outgoing submission to the web site.

3. The computer-implemented method of claim 1, wherein tracking the user's input to the web site comprises tracking an intended number of submissions the user generates through the web browser.

4. The computer-implemented method of claim 3, wherein the transaction fingerprint comprises an expected number of submissions to the web site.

5. The computer-implemented method of claim 4, wherein determining whether the user's input generated the outgoing submission comprises:
    determining whether the expected number of submissions to the web site matches both the intended number of submissions to the web site the user generates through the web browser and an actual number of submissions to the web site.

6. The computer-implemented method of claim 1, wherein the transaction fingerprint comprises an expected order of submissions to the website.

7. The computer-implemented method of claim 6, wherein determining whether the user's input generated the outgoing submission comprises:
    determining whether the expected order of submissions to the web site matches an actual order of submissions.

8. The computer-implemented method of claim 1, wherein the transaction fingerprint is supplied by a security vendor.

9. The computer-implemented method of claim 1, further comprising:
    if the outgoing submission is not determined to have been generated by the user's input, performing a security action.

10. The computer-implemented method of claim 9, wherein the security action comprises:
    querying the user whether to relay the outgoing submission to the web site.

11. The computer-implemented method of claim 9, wherein the security action comprises:
    submitting an incident report to a security vendor, wherein the incident report comprises at least one of:
    a location of the web site;
    contents of the outgoing submission;
    information to identify the user;
    date and time information associated with the outgoing submission.

12. The computer-implemented method of claim 1, further comprising:
    generating the transaction fingerprint based on the user's input to the web site.

13. The computer-implemented method of claim 1, wherein the user's input comprises input to a form on the website.

14. A system for detecting and intercepting man-in-the-browser attacks, the system comprising:
    a fingerprint module programmed to:
        identify a transaction fingerprint associated with a web site;
    a user interaction module programmed to:
        track a user's input to the web site in a web browser;
    a web request module in communication with the fingerprint module and the user interaction module and programmed to:
        intercept an outgoing submission to the web site;
        determine whether, in light of the transaction fingerprint, the user's input generated the outgoing submission.

15. The system of claim 14, wherein the web request module is programmed to relay the outgoing submission to the web site if the outgoing submission is determined to have been generated by the user's input.

16. The system of claim 14, wherein the user interaction module is programmed to track the user's input to the web site by tracking an intended number of submissions to the web site the user generates through the web browser.

17. The system of claim 16, wherein the transaction fingerprint comprises an expected number of submissions to the web site.

18. The system of claim 17, wherein the web request module determines whether the user's input generated the outgoing submission by determining whether the expected number of submissions to the web site matches both the intended number of submissions to the web site and an actual number of submissions to the web site.

19. The system of claim 14, wherein the fingerprint module receives the transaction fingerprint from a security vendor.

20. A non-transitory computer-readable medium that, when executed by a computing device, causes the computing device to:
    identify a transaction fingerprint associated with a web site;
    track a user's input to the web site in a web browser;
    intercept an outgoing submission with the web site;
    determine whether, in light of the transaction fingerprint, the user's input generated the outgoing submission.

* * * * *